(12) United States Patent
Shen-Orr et al.

(10) Patent No.: US 8,913,745 B2
(45) Date of Patent: Dec. 16, 2014

(54) SECURITY WITHIN INTEGRATED CIRCUITS

(71) Applicant: Cisco Technology Inc., San Jose, CA (US)

(72) Inventors: Chaim Shen-Orr, Haifa (IL); Zvi Shkedy, Karmiel (IL); Reuven Elbaum, Haifa (IL); Yonatan Shlomovich, Givat Ada (IL); Yigal Shapiro, Zichron Yaakov (IL); Yaacov Belenky, Maaleh Adumim (IL); Yaakov (Jordan) Levy, Maaleh Adumim (IL); Reuben Sumner, Rechovot (IL); Itsik Mantin, Shoham (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/958,986

(22) Filed: Aug. 5, 2013

(65) Prior Publication Data
US 2013/0326632 A1    Dec. 5, 2013

Related U.S. Application Data

(63) Continuation of application No. 12/736,564, filed as application No. PCT/IB2009/052135 on May 21, 2009, now Pat. No. 8,539,596.

(30) Foreign Application Priority Data

Jun. 24, 2008 (IL) .......................................... 192411
Dec. 18, 2008 (IL) .......................................... 196079

(51) Int. Cl.
*H04L 9/34* (2006.01)
*G06F 21/79* (2013.01)
*G06F 21/60* (2013.01)
*H04L 9/18* (2006.01)

(52) U.S. Cl.
CPC ............... *G06F 21/60* (2013.01); *G06F 21/79* (2013.01)
USPC ........................... 380/262; 380/263; 380/286

(58) Field of Classification Search
None
See application file for complete search history.

(56) References Cited

U.S. PATENT DOCUMENTS 4,386,234 A * 5/1983 Ehrsam et al. ................. 380/281
5,477,039 A 12/1995 Lisimaque et al.
(Continued)

FOREIGN PATENT DOCUMENTS

DE   103 24 419 A1   1/2005
EP   1 098 471 A2    5/2001
(Continued)

OTHER PUBLICATIONS

Feb. 5, 2014 Office Communication in connection with prosecution of EP 13 17 9480.2.
(Continued)

*Primary Examiner* — Venkat Perungavoor
(74) *Attorney, Agent, or Firm* — Husch Blackwell LLP

(57) ABSTRACT

A method for hindering detection of information unintentionally leaked from a secret held in a memory unit is described, the method including receiving a triggering event waiting for at least a first amount of time to pass after the receipt of the triggering event, the memory unit being in a non-operational state during the at least a first amount of time after the at least a first amount of time has passed, changing at least one first condition under which the memory unit operates, thereby causing the memory unit to enter an operational state, waiting for a second amount of time to pass after the changing at least one first condition, and changing, after the second amount of time, at least one second condition under which the memory unit operates, thereby causing the memory unit to enter the non-operational state, wherein access to the secret information is enabled only during the second amount of time, and detection of secret information unintentionally leaked is limited during the first amount of time. Related apparatus and methods are also described.

12 Claims, 5 Drawing Sheets

(56) References Cited

U.S. PATENT DOCUMENTS

| | | | |
|---|---|---|---|
| 5,880,523 | A | 3/1999 | Candelore |
| 5,987,572 | A | 11/1999 | Weidner et al. |
| 6,414,884 | B1 | 7/2002 | DeFelice et al. |
| 6,507,913 | B1 | 1/2003 | Shamir |
| 6,633,501 | B2 | 10/2003 | Wedel |
| 6,724,894 | B1 | 4/2004 | Singer |
| 6,880,081 | B1 | 4/2005 | Itkis |
| 7,127,620 | B2 | 10/2006 | Boeckeler |
| 7,146,509 | B2 | 12/2006 | Marinet et al. |
| 7,170,997 | B2 * | 1/2007 | Petersen et al. ............ 380/268 |
| 7,362,140 | B2 | 4/2008 | Hassoune et al. |
| 7,397,916 | B2 | 7/2008 | Johnson et al. |
| 7,440,570 | B2 * | 10/2008 | Short ........................ 380/44 |
| 2002/0054682 | A1 * | 5/2002 | Di Bernardo et al. ...... 380/263 |
| 2003/0007639 | A1 * | 1/2003 | Lambert .................... 380/263 |
| 2003/0095659 | A1 * | 5/2003 | Ishihara et al. ............ 380/46 |
| 2003/0105967 | A1 | 6/2003 | Nam |
| 2004/0123132 | A1 | 6/2004 | Montgomery et al. |
| 2005/0129247 | A1 * | 6/2005 | Gammel et al. ............ 380/286 |
| 2005/0241005 | A1 | 10/2005 | Kunemund |
| 2006/0271795 | A1 | 11/2006 | Salle |
| 2007/0230694 | A1 * | 10/2007 | Rose et al. ................ 380/46 |
| 2008/0088996 | A1 | 4/2008 | Bonvalot et al. |

FOREIGN PATENT DOCUMENTS

| | | |
|---|---|---|
| EP | 1 462 908 A2 | 9/2004 |
| EP | 1 587 237 A1 | 10/2005 |
| FR | 2 818 845 | 6/2002 |
| WO | WO 03/102510 A2 | 12/2003 |
| WO | WO 2005/114733 A1 | 12/2005 |
| WO | WO 2007/086046 A2 | 8/2007 |

OTHER PUBLICATIONS

Dec. 9, 2013 Office Communication in connection with prosecution of EP 09 769 691.8.

Aug. 19, 2009 Communication from International Searching Authority in connection with captioned application.

Aug. 26, 2010 Written Opinion of the International Searching Authority in connection with captioned application.

Nov. 2, 2012 Office Communication in connection with prosecution of EP 09 769 691.8.

Dec. 18, 2012 Office Communication in connection with prosecution of CN 2009 8011 7795.1.

Daniel Bockelman et al., "Multi-Point Probing on 65NM Silicon Technology Using Static Irem-Based Methodology," *Proceedings of the 31st Int'l Symposium for Testing and Failure Analysis*, pp. 40-45, Nov. 2005 (ASM Int'l 2005).

Christopher Clavier et al., "Differential Power Analysis in the Presence of Hardware Countermeasures," (*Cryptographic Hardware and Embedded Systems*—CHES 2000).

Louis Goubin et al., "Des and Differential Power Analysis—The Duplication Method".

M.A. Hasan, "Power Analysis Attacks and Algorithmic Approaches to Their Countermeasures for Koblitz Curve Crypto-Systems," IEEE Trans. Computers (Oct. 2001).

Paul Kocher, "Design and Validations Strategies for Obtaining Assurances in Countermeasures to Power Analysis and Related Attacks" (Cryptography Research, Inc., Sep. 2005).

Thomas S. Messerges et al., "Investigations of Power Analysis Attacks on Smartcards," *Proceedings of USENIX Workshop on Smartcard Technology* (May 1999).

K. Rothbart et al., "Power Consumption Profile Analysis for Security Attack Simulation in Smart Cards At High Abstraction Level" *EMSOFT '05*, pp. 214-217, Sep. 2005 (ACM 2005).

M. Wendt et al., "System Level Power Profile Analysis and Optimization for Smart Cards and Mobile Devices" *SAC '08*, pp. 1884-1888, Mar. 2008 (ACM 2008).

Jun. 23, 2014 Office Communication received in connection with prosecution of EP 09 769 891.8.

\* cited by examiner

SECURITY WITHIN INTEGRATED CIRCUITS

The present application is a continuation of allowed U.S. patent application Ser. No. 12/736,564, which was a 35 USC §371 application of PCT/IB2009/052135, filed on 21 May 2009 and entitled "Security Within Integrated Circuits", which was published in the English language with International Publication Number WO 2009/156881, and which claims the benefit of priority from IL Patent Application IL 192411 of NDS Limited, filed 24 Jun. 2008, and the benefit of priority from IL Patent Application IL 196079 of NDS Limited, filed 18 Dec. 2008.

BACKGROUND OF THE INVENTION

The following references, listed by publication number, are believed to reflect the current state of the art:
U.S. Pat. No. 6,880,081 to Itkis;
WO 2007/086046 of NDS Ltd.;
WO 2005/114733 of NDS Ltd.; and
WO 2003/102510 of NDS Ltd.

SUMMARY OF THE INVENTION

There is thus provided in accordance with an embodiment of the present invention a method for hindering detection of information unintentionally leaked from a secret held in a memory unit, the method including receiving a triggering event, waiting for at least a first amount of time to pass after the receipt of the triggering event, the memory unit being in a non-operational state during the at least a first amount of time, after the at least a first amount of time has passed, changing at least one first condition under which the memory unit operates, thereby causing the memory unit to enter an operational state, waiting for a second amount of time to pass after the changing at least one first condition, and changing, after the second amount of time, at least one second condition under which the memory unit operates, thereby causing the memory unit to enter the non-operational state, wherein access to the secret information is enabled only during the second amount of time, and detection of secret information unintentionally leaked is limited during the first amount of time.

Further in accordance with an embodiment of the present invention the detection of secret information unintentionally leaked is disabled during the first amount of time.

Still further in accordance with an embodiment of the present invention the triggering event includes receiving a reset signal at one of an integrated circuit including the memory unit, the memory unit, an element on an integrated circuit including the memory unit, a memory unit controller, and a memory unit interface.

Additionally in accordance with an embodiment of the present invention the triggering event includes powering up of at least one of an integrated circuit including the memory unit, the memory unit, an element on an integrated circuit including the memory unit, a memory unit controller, and a memory unit interface.

Moreover in accordance with an embodiment of the present invention the triggering event includes detecting at least one interface signal input to the memory unit.

Further in accordance with an embodiment of the present invention the triggering event includes receiving a request for access to the secret information stored in the memory unit.

Still further in accordance with an embodiment of the present invention the second amount of time is terminated immediately upon termination of accessing of the secret information.

Additionally in accordance with an embodiment of the present invention the changing at least one second condition under which the memory unit operates includes lowering voltage applied to the memory unit such that the voltage is lowered to a voltage level required for the memory unit to be in the state whereby the memory unit retains the secret information, and the secret information is not accessible.

Moreover in accordance with an embodiment of the present invention the changing at least one second condition under which the memory unit operates includes one of disabling, disconnecting, and forcing at least one interface signal of the memory unit.

Further in accordance with an embodiment of the present invention at least one of the first amount of time, and the second amount of time is measured by a timing mechanism.

Still further in accordance with an embodiment of the present invention the timing mechanism includes a timing mechanism which is tamper resistant.

Additionally in accordance with an embodiment of the present invention the timing mechanism includes a free running oscillator.

Moreover in accordance with an embodiment of the present invention the timing mechanism includes a clock module.

Further in accordance with an embodiment of the present invention the timing mechanism includes an analog timer.

Still further in accordance with an embodiment of the present invention the timing mechanism includes a software loop.

Additionally in accordance with an embodiment of the present invention the first amount of time includes a fixed amount of time.

Moreover in accordance with an embodiment of the present invention first amount of time includes a variable amount of time.

Further in accordance with an embodiment of the present invention the second amount of time includes a fixed amount of time.

Still further in accordance with an embodiment of the present invention the second amount of time includes a variable amount of time.

Additionally in accordance with an embodiment of the present invention the secret information included in the memory unit is included in the memory unit in an obfuscated form.

Moreover in accordance with an embodiment of the present invention obfuscation includes cryptographic obfuscation.

Further in accordance with an embodiment of the present invention including outputting the secret information to a second memory unit, storing the secret information in a location within the second memory unit, episodically re-deriving the secret information, and storing the re-derived secret information at the location wherein the episodic re-deriving of the secret information causes an episodic change of physical contents of the second memory unit holding the secret information, thereby causing the secret information unintentionally leaked from the memory unit to vary over time causing any detector of leaked information requiring long collection times to receive an average of the leaked information, the average of the leaked information not revealing the leaked information.

Still further in accordance with an embodiment of the present invention the second memory unit includes one of a register, and RAM.

Additionally in accordance with an embodiment of the present invention the re-deriving the secret information includes a XOR-ing the secret information with a pseudo-random number.

There is also provided in accordance with another embodiment of the present invention a method for hindering detection of secret information unintentionally leaked from a secret held in a memory unit, the method including storing the secret information in a location within the memory unit, episodically re-deriving the secret information, and storing the re-derived secret information at the location within the memory unit, wherein the episodic re-deriving of the secret information causes an episodic change of physical contents of the memory unit holding the secret information, thereby causing the secret information unintentionally leaked from the memory unit to vary over time causing any detector of leaked information requiring long collection times to receive an average of the leaked information, the average of the leaked information not revealing the leaked information.

Further in accordance with an embodiment of the present invention the memory unit includes one of a register, and random access memory.

Still further in accordance with an embodiment of the present invention the re-deriving the secret information includes a XOR-ing the secret information with one of a random number, and a pseudo-random number.

Additionally in accordance with an embodiment of the present invention the episodically re-deriving the secret information is performed at time intervals dependent on a timing mechanism which is tamper resistant.

Moreover in accordance with an embodiment of the present invention the time intervals are random time intervals.

There is also provided in accordance with still another embodiment of the present invention a system for hindering detection of information unintentionally leaked from a secret held in a memory unit, the system including a triggering event receiver, the triggering event receiver operative to wait for at least a first amount of time to pass after the receipt of the triggering event, the memory unit being in a non-operational state during the at least a first amount of time, a memory unit first condition changer which, after the at least a first amount of time has passed, changes at least one first condition under which the memory unit operates, thereby causing the memory unit to enter an operational state and waiting for a second amount of time to pass after the changing at least one first condition, and a memory unit second condition changer, which, after the second amount of time, changes at least one second condition under which the memory unit operates, thereby causing the memory unit to enter the non-operational state, wherein access to the secret information is enabled only during the second amount of time, and detection of secret information unintentionally leaked is limited during the first amount of time.

There is also provided in accordance with still another embodiment of the present invention a system for hindering detection of secret information unintentionally leaked from a secret held in a memory unit, the system including a secret information store which stores the secret information in a location within the memory unit, an episodic secret information re-deriver, and the secret information store being operative to store the re-derived secret information at the location within the memory unit, wherein the episodic re-deriving of the secret information causes an episodic change of physical contents of the memory unit holding the secret information, thereby causing the secret information unintentionally leaked from the memory unit to vary over time causing any detector of leaked information requiring long collection times to receive an average of the leaked information, the average of the leaked information not revealing the leaked information.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
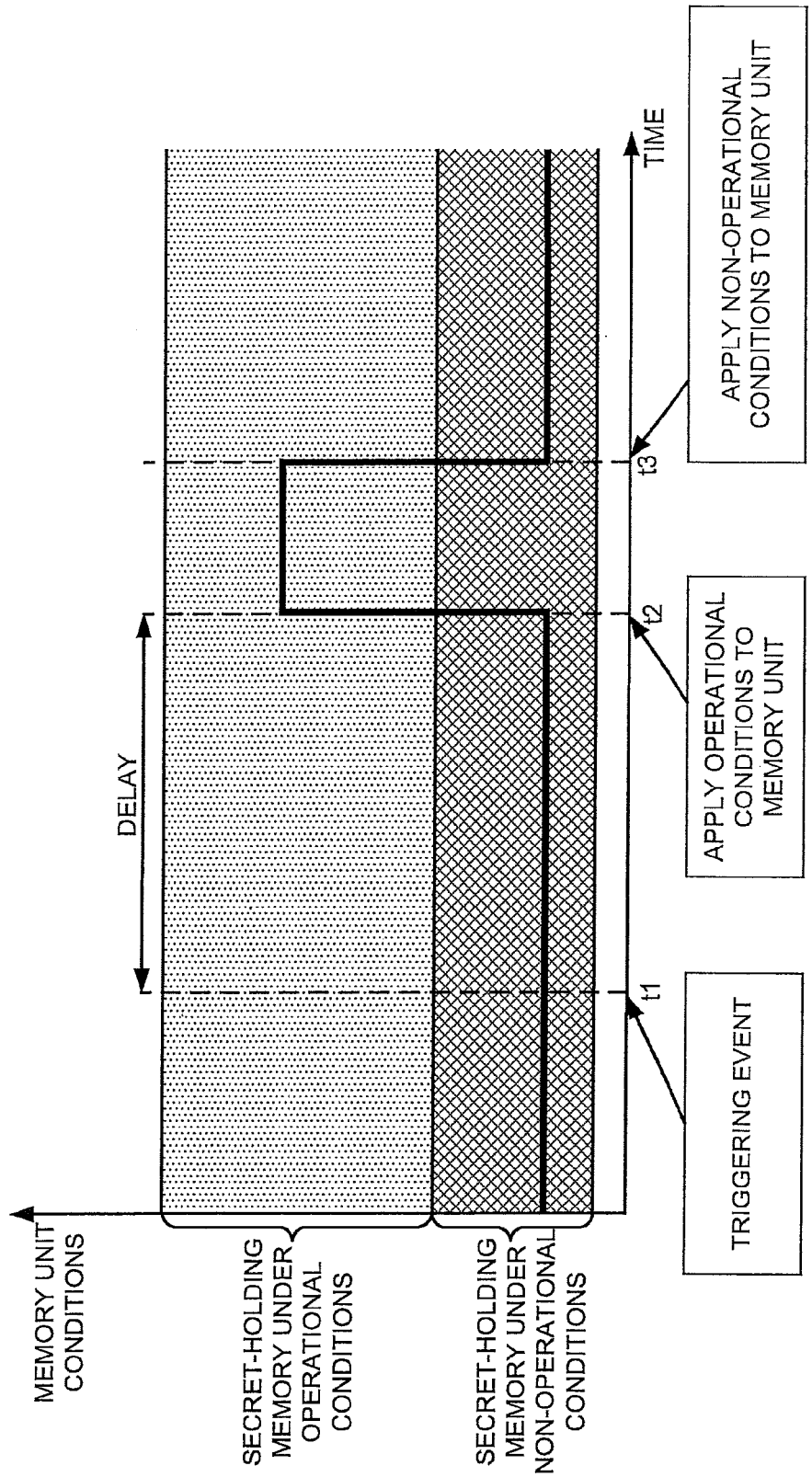
FIG. 1 is a simplified generalized graphical depiction of memory element conditions in a memory element in an integrated circuit over time, the memory element and integrated circuit incorporating a system for hindering detection of secret information leaked from a memory element constructed and operative in accordance with an embodiment of the present invention.

Integrated circuits frequently comprise memory units, the memory units comprising physical memory elements and interfaces to the physical memory elements, such as but not limited to ROM (Read Only Memory), RAM (Random Access Memory), and registers, and interfaces to the physical memory elements. The memory units may comprise stored secret information, especially when the memory units are used in secure devices. Such secret information frequently includes, but is not limited to cryptographic keys. The secret information should be neither readable by, nor leakable to an outside observer, hereinafter referred to as an attacker.

Memory units, such as the memory units described above, are typically accessed by another circuit or another unit in a circuit whether the accessing circuit is in the same integrated circuit as the memory unit or the accessing circuit is outside the memory unit. Those skilled in the art will appreciate that the term "access", in all of its grammatical forms, such as "accessed" as used in the phrase, "memory units are typically accessed by another circuit" to mean: read data; write data; modify data; erase data; and so forth, as is well known in the art. In order to access such a memory unit, the memory unit should be in an "operational state", that is, input signals into and output signals from the memory unit are not blocked, and the memory unit has all of the conditions specified by the manufacturer of the memory unit as required for proper operation of the memory unit, thereby allowing access to data stored in the memory unit. For example, and without limiting the generality of the foregoing, voltage is supplied to the memory unit at the voltage level specified by the manufacturer of the memory unit. Additionally, some memory units such as DRAMs (Dynamic Random Access Memory) have to be input clock signals in specified amplitudes, frequencies, or rise times, etc. for operational conditions to be maintained.

It is appreciated that, as opposed to the operational state, the memory unit may be in a non-operational state. The non-operational state is comprised to two different sub-states:

a "retention state", that is, conditions that will retain the secret information in the memory unit while making data stored in the memory unit inaccessible, either directly or indirectly; and a non-retention state, in which maintenance of the secret information in the memory unit is not guaranteed, and the secret information may be erased from the memory unit.

Typically, when the memory unit is not being accessed, the memory unit is nevertheless kept in the operational state, thus, as described above, the memory unit can be accessed unconditionally at any time. Alternatively, the memory unit may be held in a non-operational state, wherein the memory unit will not provide access to data stored therein. One method of making a memory unit non-operational is by controlling the memory unit's interface.

Another method of making a memory unit non-operational is by removing at least one condition for operation specified by a memory unit manufacturer. For example and without limiting the generality of the foregoing, a non-volatile memory unit may be disconnected from power, or clock signals may be removed from the memory unit, without loosing the data comprised therein. Thus, power consumption may be saved when the memory unit is not accessed.

In the last ten years or so, a few technologies have evolved which allow indirectly reading of the contents of such memory units, such as those comprising the secret information. Such techniques are referred to as "side channel analysis". Among the more popular side channel analysis techniques are techniques for collecting signals that leak through the integrated circuit's power lines, or signals leaked by photons emitted and/or reflected due to a transistor's logical-state (on/off) or due to a transition from one transistor logical state to another transistor logical state. Some of the side channel analysis techniques extract information by collecting and processing weak signals leaked from the memory unit even if the memory unit is not being accessed. Those skilled in the art will appreciate that some information leaks are continuous emissions, and some information leaks are emitted upon transitions of signals inside the integrated circuitry.

The term "leak", in all of its grammatical forms, as used in the present specification and claims, is understood to mean unintentionally revealing information from the memory unit, for example, by side channel analysis, photon emission and detection, and so forth. The use of the term "leak" to mean unintentionally revealing information from the memory unit explicitly excludes a direct revelation of information via standard output lines utilized during normal circuit operation. However, the term leak does include revelation of information using side channel techniques, as discussed above, from other units to which the secret information may have propagated via functional connections while being accessed.

Typical techniques used by attackers to read such secret information include: observing an operating integrated circuit and destructive processes, such as delayering the integrated circuit. The attacker may use a variety of means for attacking and observing the integrated circuit in order to compromise the secret information. Among the means available to the attacker are scanning electron microscopes (SEM), atomic force microscopes (AFM), and instruments designed to detect emissions, typically optical emissions, produced by basic circuit elements. Those skilled in the art will appreciate that emissions from basic circuit elements differ when the element's value is "0" and when the element's value is "1". Furthermore, an emission is generated when the element's value changes from "0" to "1" or from "1" to "0".

Two observations may be made about potential attacks:
1. physical layout of circuit elements used to hold secret information over time (that is, memory units), for example and without limiting the generality of the foregoing: Non-volatile One Time Programmable (OTP) memory which maintains its content over boot cycles; and output (or "intermediate") registers associated with OTP, RAM, and other memory units; and so forth, tend to have more regular physical structures and are reused less than computing elements such as crypto engines and intermediate registers. The same is true for RAM that are often not physically cleared on boot, and therefore tend to hold values over boot cycles; and
2. signals leaking from the integrated circuit (that is, emitted externally) when the integrated circuit is operating tend to be very weak signals. Thus, positive determination of memory unit value is achieved by collecting and accumulating the emitted signals over a long time, over many occurrences of the signal being emitted, or both.

The present invention, in embodiments thereof, comprises systems and methods, described below, making collection of signals, as described above, using side channel analysis techniques, infeasible, or at least "impractical" or "commercially impractical". That is to say, the time and cost invested in retrieving such a secret from an integrated circuit will be high enough that retrieving such a secret will not to pose a threat to the secret holder.

As an example, from another area of endeavor, if a thief attempts to pick a combination safe with two wheels of 20 numbers each (i.e. <400 trials will open the safe), then opening the safe is considered practical—if it takes 10 seconds per try, safe will be open in about an hour. But if the safe has 3 wheels with 50 numbers each, the thief will have to try up to 125000 combinations, requiring less than 21,000 hours of work (it would require slightly more than 20,833 hours to try all combinations, which is to say slightly more than 868 days). Thus it would be considered "impractical", although scientifically feasible, to attempt such an exhaustive attack on the safe.

Returning now to the discussion of embodiments of the present invention, those conditions that are applied in order to maintain the operational state are removed when the memory unit is not accessed. As explained below in greater detail, for non-volatile memory units comprising secret information, the voltage supply is removed from the memory unit, when the secret information is not accessed. For volatile memory units, (such as, but not limited to registers, Static RAMs, dynamic RAMs), since total power removal will result in loss of the secret information, and thus, in order to retain the secret information, "operation conditions" (that is, conditions that are applied in order to maintain the operational state) may be replaced by retention conditions. Thus, because retention conditions reduce side channel leakage, side channel leaks either become infeasible, or at least are reduced to levels considered to be impractical, whereas, conditions that reduce leakage may not necessarily prevent functional access to the memory element. It is appreciated that when the memory unit is in a state of non-operational conditions, no information may be gotten in to or out of the memory unit, whether via the memory unit's regular interface or via some extraordinary interface (for instance, built-in testing circuitry). For example and without limiting the generality of the foregoing, under non-operational conditions, forcing read/write/address signals into the memory unit, or disconnecting the input or output path of data to the memory unit would be either impossible, infeasible, or at best, useless.

By way of example, in some applications the memory unit comprising the secret information is accessed less than 1/10,000 of total operation time. If the memory unit comprising the secret information is kept in an operational state for the total operation time, photonic gathering equipment operating under presently known technological conditions would need 10 minutes of signal collection to reliably discover the secret information. Ensuring that the memory unit is maintained at non-operational conditions 99.99% of the total operation time, since leakage under non-operational conditions is not feasible, as explained above, collection time is therefore increased to 100,000 minutes (that is, slightly less than 70 days). It is the opinion of the inventors of the present invention that 70 days of analysis of the memory unit with expensive photonic gathering equipment would be considered impractical.

Therefore, it would seem effective to apply operational conditions whenever the memory unit is accessed, and to apply non-operational conditions (such as retention conditions) the rest of the time whenever the memory unit is not accessed. Furthermore, in some embodiments of the present invention, the memory unit comprising the secret information is only accessed after a first amount of time and only for a limited second amount of time, and, by adding an independent timing mechanism that will ensure that leakage will be kept at impractical levels.

Those skilled in the art will appreciate that the timing mechanism comprises an independent timing mechanism which is protected against being manipulated by an attacker. For example, if the timing mechanism is based on counting an external clock input to the integrated circuit, then an attacker may stop external clock while memory is in operational state. On the other hand, if the timing mechanism counts an internal free running oscillator, then the timing mechanism is independent (i.e. not subject to an attacker's manipulations).

In light of the above discussion, reference is now made to FIG. 1, which is a simplified generalized graphical depiction of memory unit conditions in a memory unit in an integrated circuit over time, the memory unit and integrated circuit incorporating a system for hindering detection of secret information leaked from a memory unit constructed and operative in accordance with an embodiment of the present invention. One exemplary implementation of the system of FIG. 1 comprises a timing mechanism, a variable voltage regulator, and the memory unit, the memory unit being comprised on the integrated circuit, as described below with reference to FIG. 2. Any appropriate timing mechanism may be used. Exemplary timing mechanisms include, but are not limited to: clock cycles, an analog timer, a software loop, and so forth.

At a first time, t1, the memory unit receives a triggering event. The triggering event may be initiated by any of:
  activity of functional input signals to the memory unit;
  a reset signal;
  a power-up event, a special requesting signal sent from another unit inside or outside the integrated circuit; and
  so forth.

It is appreciated that at power up, the actual powering up or reset signal of the integrated circuit comprising the memory unit, or the actual powering up or reset signal of any block inside an operational circuit comprising the memory unit may comprise the triggering event. Additionally, certain hardware signals sent to the memory unit may comprise the triggering event. For example and without limiting the generality of the foregoing, a chip select signal; a hardware signal derived from an address value on an address bus; and a read/write signal may all comprise the triggering event.

At time t1, and prior to time t1, the memory unit is under non-operational conditions, as explained above. At a second time, t2, operational conditions are applied to the memory unit. When operational conditions are applied to the memory unit, the memory unit becomes accessible. The time between t1 and t2 corresponds to the delay mentioned above. At a third time, t3, operational conditions are removed from the memory unit, and then, non-operational conditions are applied again to the memory unit.

It is appreciated that as a result of design consideration a first amount of time, comprising the delay between t1 and t2, may comprise either a fixed or a variable amount of time. It is also appreciated that the variable amount of time may be made to vary between successive memory accesses. For example and without limiting the generality of the foregoing, the variable amount of time may comprise a one second delay prior to a first memory access, a zero second delay prior to a second memory access, and a one half second delay prior to a third memory access, and so forth.

Those skilled in the art will appreciate that the triggering event might occur during a time when the memory unit is held in the operational state (even if original logic design of the memory unit had prevented such a mishap, an attacker may circumvent normal operation and cause such a triggering event to occur). In some implementations of the present invention, the memory unit will always cycle through t1 to t2 to t3 before responding to a second, intervening, triggering event. Alternatively, the second, intervening, triggering event may be ignored.

The time between t2 and t3, during which operational conditions are applied to the memory unit may be terminated by an external mechanism immediately upon termination of accessing the secret information. For example and without limiting the generality of the foregoing, the external mechanism may comprise removal of a select hardware signal originating from a requesting unit from which the request to the memory unit originated.

Those skilled in the art will appreciate that in certain embodiments of the present invention, some memory units comprised in the integrated circuit might comprise configuration data, and not secret information. Memory units comprising configuration data would not be subject to a delay in having power applied. Delays in applying power would be applied to a memory unit comprising secret information, as discussed above.

Typical attacks based on a repeated "boot-signal collection-boot" cycle assume that the "boot-signal collection-boot" cycle requires a few microseconds at most. Increasing duration of the "boot-signal collection-boot" by some orders of magnitude will cause, per-force, a corresponding increase in duration of overall attack time. For example and without limiting the generality of the foregoing, delaying the "boot-signal collection-boot" cycle to close to 100 milliseconds may make the "boot-signal collection-boot" cycle based attack impractical.

It is appreciated that the term "boot", in all of its grammatical forms, is understood to refer to both:
  "soft boot", when a circuit or computer is restarted under software control, without removing power or applying a reset signal; and
  "hard boot", when power to a circuit or a computer is turned off and then on or a special reset signal to the processor is triggered, thereby restarting the circuit or computer.

After operational conditions are applied to the memory unit, the operational conditions are held until time t3, as described above. After time t3, at least one condition under which the memory unit operates is changed so that collection of side channel leakage is no longer practical. For example and without limiting the generality of the foregoing, voltage applied to the memory unit is changed to non-operational conditions, so that collection of emissions is no longer feasible, without a particularly expensive and difficult to operate equipment. The amount of time between t2 and t3 is typically chosen to allow passing the secret information to intermediate registers, and so forth. It is appreciated that intermediate registers may comprise RAM locations disposed in a random or seemingly random fashion about the integrated circuit. It is also appreciated that some obfuscation, or, as appropriate, deobfuscation, of secret information is carried out while the secret information is written to and/or read out to or from the intermediate registers. For example and without limiting the generality of the foregoing, the obfuscation may comprise cryptographically obfuscating the secret information.

It is appreciated that as a result of design consideration the amount of time between t2 and t3 may comprise either a fixed amount of time or a variable amount of time. It is also appreciated that the variable amount of time may vary between successive memory accesses.

In that information stored in the memory unit is only accessible while operational conditions are applied to the memory unit, if the amount of time between t2 and t3 is of appropriately short duration, the information stored in the memory unit is therefore only available briefly. For example and without limiting the generality of the foregoing, applying power to OTP cells, or to output registers associated with the OTP cells, only at the start of a memory readout cycle, and removing power after two digital clock cycles hinders gathering leaking information from the OTP cells and their associated output registers, in that the leaked information is only available for a very short duration.

FIG. 1 depicts a threshold level between the operational conditions and the non-operational (or retention) conditions. One example where operational conditions may be changed to non-operational conditions is changing a digital controlling signal affecting the interface of the memory unit, thus denying access to the memory unit. Another example, where operational conditions may be changed to non-operational conditions is changing supply voltage of the memory unit. For example and without limiting the generality of the foregoing, typical operational voltage level for state of the art circuitry at the present time is between 1.0 V (for 0.065 micron processes)-1.8 V (for 0.18 micron processes). For example and without limiting the generality of the foregoing, consider a flip-flop comprised of two CMOS (Complementary metal-oxide-semiconductor) inverters, as is known in the art. If the flip-flop uses transistors with Vt of 0.3V or less, (Vt being a voltage across a gate which holds a transistor in an "on" state, as is known in the art) the flip-flop should retain its state if the supply voltage were to drop to 0.4V. Thus, a typical suggested retention level for preventing photonic leakage would be 0.5±0.1V. The inventors of the present invention believe that in state of the art silicon based circuits, there is no detectable emission when the applied voltage is below threshold level of about 0.6-0.7V.

Figure 2:
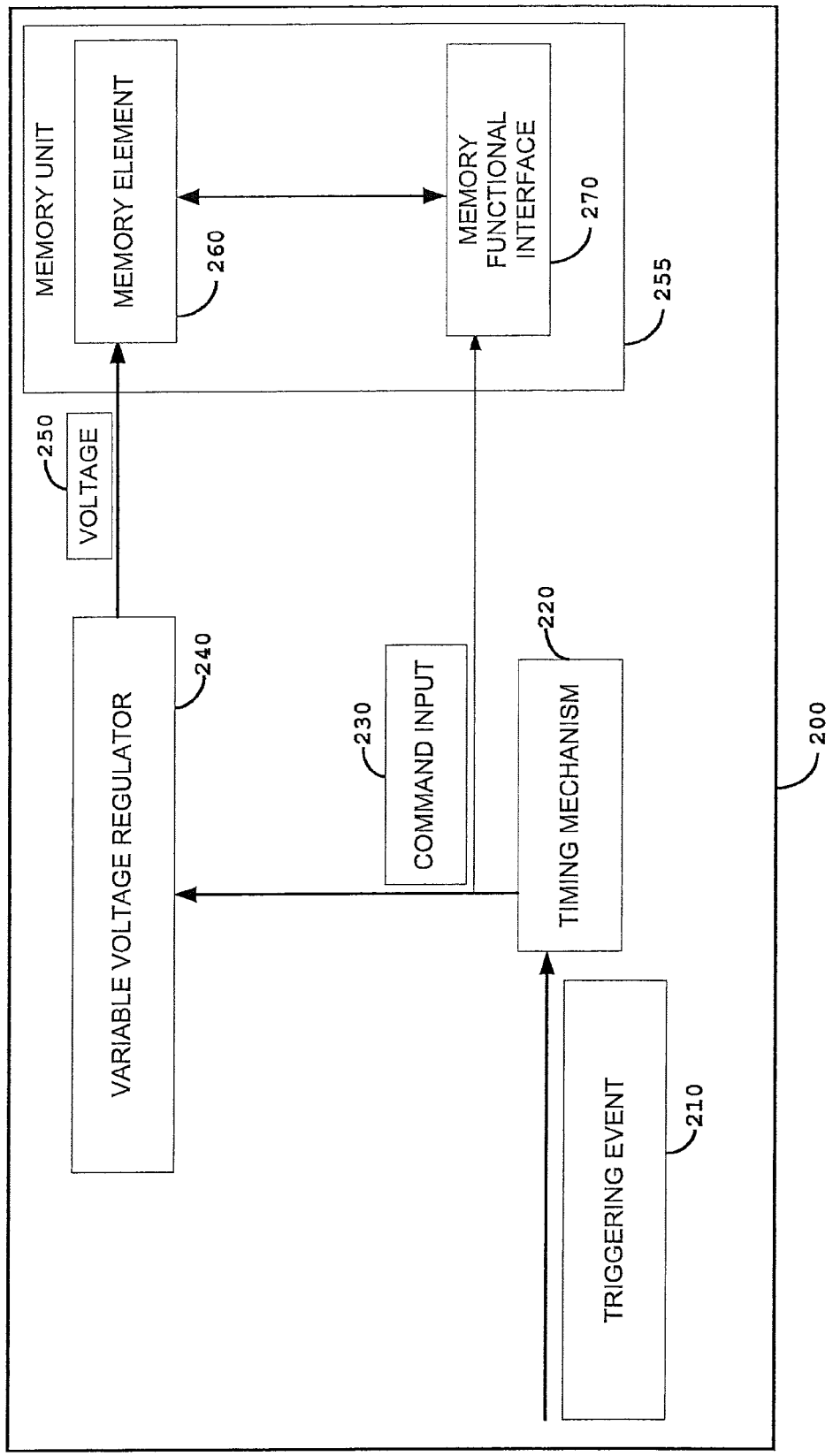
FIG. 2 is a block diagram illustration of a portion of an exemplary integrated circuit which operates according to the system of FIG. 1.

Reference is now additionally made to FIG. 2, which is block diagram illustration of a portion of an exemplary integrated circuit 200 which operates according to the system of FIG. 1. When the triggering event 210 to the memory unit comprising the secret info nation is received at time t1, the triggering event 210 is input to the timing mechanism 220. It is appreciated that the triggering event 210 may originate either from inside the integrated circuit 200 or from elsewhere not inside integrated circuit 200. At time t2 the timing mechanism 220 relays a command 230 to a variable voltage regulator 240 and to a memory functional interface 270. The variable voltage regulator 240 applies operational level voltage 250 to the memory element 260, the memory element 260 comprises physical memory, and is comprised in a memory unit 255, the memory element 260 comprising the secret information. The voltage 250 applied to the memory element 260 causes the memory element 260 to enter the operational state. The command 230 applied to the memory functional interface 270 enables the memory unit 255 to be accessed, that is, to be in the operational state. Once in the operational state, the memory element 260 is then able to communicate with the memory functional interface 270, and at such time allow the memory functional interface 270 to access the secret information comprised in the memory element 260. At time t3, the variable voltage regulator 240 lowers the voltage 250 applied to the memory element 260, thereby applying non-operational conditions to the memory element 260. In addition, the memory functional interface 270 blocks functional access to the memory element 260, thereby making the memory unit 255 enter the non-operational state. Once non-operational conditions have been applied to the memory unit 255, the memory element 260 is no longer able to communicate with the memory functional interface 270.

It is appreciated that the changing of the at least one operational condition so that the memory unit enters the non-operational state comprises, in the above description, lowering the voltage. It is further appreciated that the changing of the at least one operational condition may comprise one of: disabling; disconnecting; and forcing at least one interface signal of the memory unit.

It is appreciated that the timing mechanism 220 may comprise any appropriate timing mechanism, for example and without limiting the generality of the foregoing, a clock module, an analog timer, or a software loop, as is well known in the art. Furthermore, the timing mechanism may comprise a timing mechanism which may be designed so that it is tamper resistant, which is to say that it is not subject to external manipulations, such as, but not limited to an unstoppable timing mechanism, as is well known in the art. The timing mechanism may be rendered unstoppable in any one of a variety of methods well known in the art. For example and without limiting the generality of the foregoing, the timing mechanism may be rendered unstoppable by containing a ring oscillator which is not affected by external manipulations.

Figure 3:
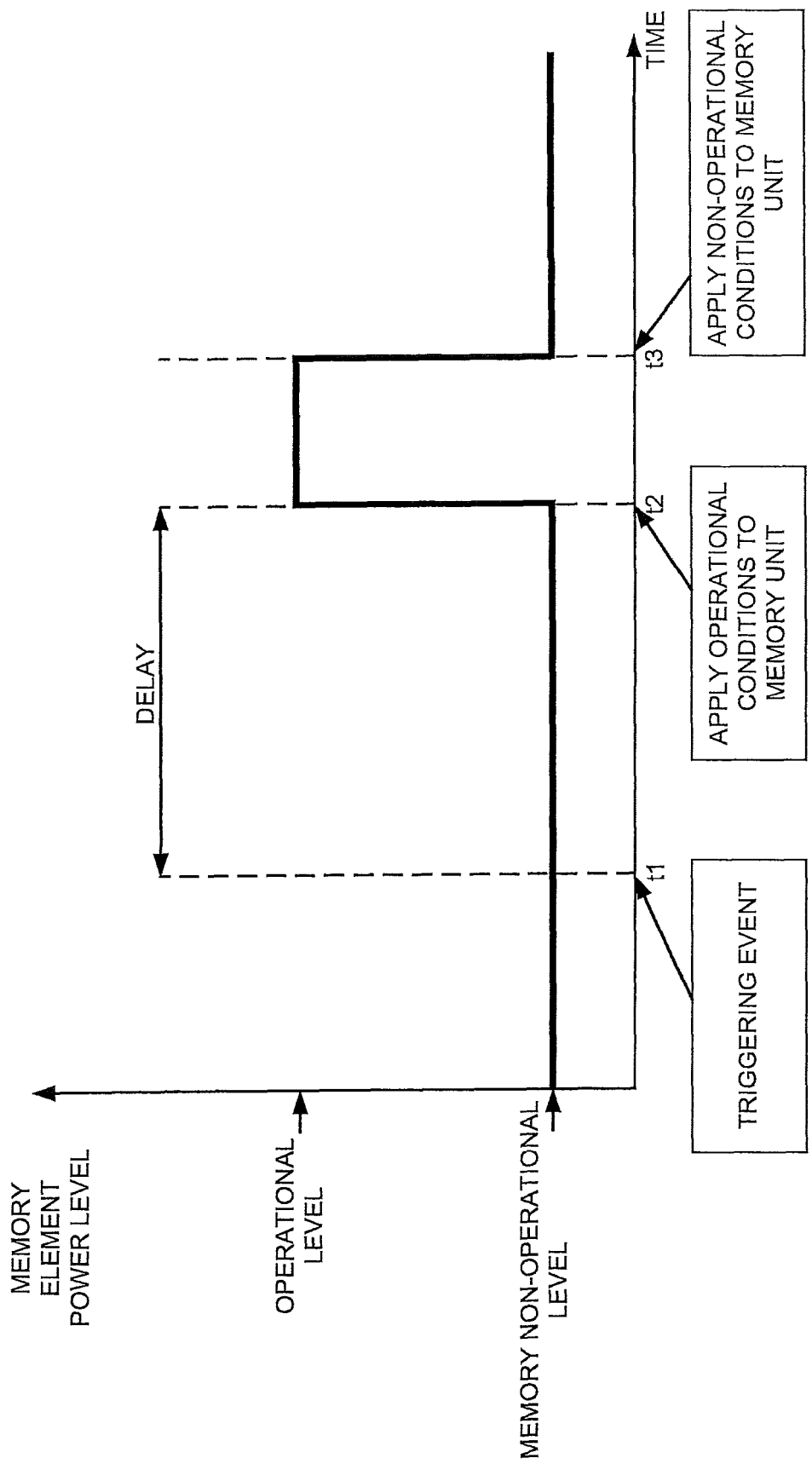
FIG. 3 depicts one particular implementation of the system of FIG. 1.

Reference is now made to FIG. 3, which depicts one particular implementation of the system of FIG. 1. In the particular case depicted in FIG. 3, memory unit conditions discussed in FIG. 1 are described in light of the discussion of FIG. 2 as comprising power applied to the memory unit. Thus, the operational conditions of FIG. 1 are depicted as an operational level in FIG. 3, the operational level being an operational voltage level. Likewise, the non-operational conditions of FIG. 1 are depicted as a non-operational level in FIG. 3, the non-operational level being the non-operational voltage level.

In another embodiment of the present invention, where the secret information must be retained without removing operational conditions from the memory unit storing the secret information, a method for hindering detection of secret information unintentionally leaked, each bit held in the memory unit is episodically changed. Episodically changing each bit held in the memory unit over time prevents leaking signals from being accumulated in proper value and order. Thus, it is impractical to accumulate such bits.

Episodically, the secret information is re-derived, and stored in the memory unit at a same location where the secret information was previously stored. By re-deriving the secret information, collecting leakage over time effectively renders no secret, whereas, the secret information itself can be restored as needed. For example and without limiting the generality of the foregoing, then secret information may be periodically read by a circuit that reencrypts or reobfuscates the secret information and stores the new value to the same location (either in a register or in RAM). Upon receipt of a request to read the secret information, the circuit decrypts or deobfuscates the stored value, thereby rendering the secret information available for functional use.

A simple obfuscation method, by way of a non-limiting example, would be to XOR the secret information with one of a random number or a pseudo-random number before storing the secret information once again in the same location where the secret information was previously stored. When reading the secret information for functional use, the obfuscated value read from memory is XOR'ed with the same one of a random number or a pseudo-random number in order to yield the secret information.

When reading the obfuscated secret information, one of at least two methods are utilized:
  the obfuscated secret information is deobfuscated with the previous random number (for instance by XOR'ing) and then the secret information is reobfuscated with a new random or pseudo-random number; and
  the obfuscated secret information is read from memory and further obfuscated (for instance by XOR'ing) with a new random or pseudo-random number. The previous random or pseudo-random number is XOR'ed with the new random or pseudo-random number, and the result is stored as the latest random or pseudo-random number. Those skilled in the art will appreciate that XOR'ing the latest random or pseudo-random number with the obfuscated number stored in the memory will yield the deobfuscated secret information.

In another example of a simple obfuscation mechanism, the secret information is held in a register arranged as a simple cyclic shift-register (alternatively, in a more sophisticated N-bit feedback shift register, known in the art as a cyclic pseudo-random generator). Each time the register is clocked, the contents of each bit in the register changes, thereby hindering the collection of leaked signals over long periods. When a request for functional read of the secret information is made, the controlling circuitry of the cyclic shift register will first perform the required number of fast shifts until every bit of the original secret information is in its original place and value, then the cyclic shift register will read the secret information from the register.

It is appreciated that the timing mechanism used for triggering the episodic re-deriving of the secret information may be designed so that the timing mechanism comprises a tamper resistant timing mechanism.

Figure 4:
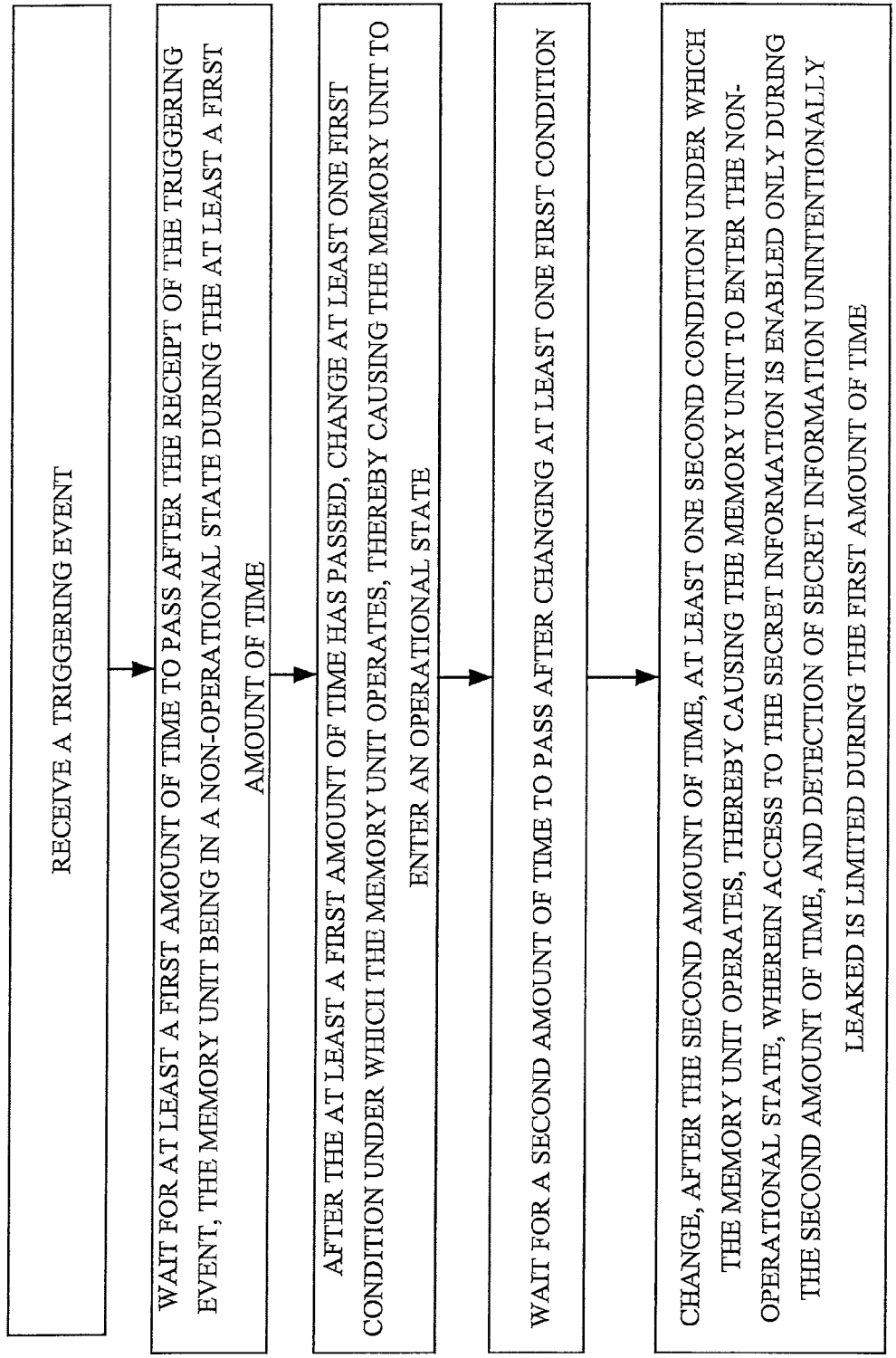
FIGS. 4 and 5 are simplified flowcharts of methods of operation of the system of FIG. 1.
Figure 5:
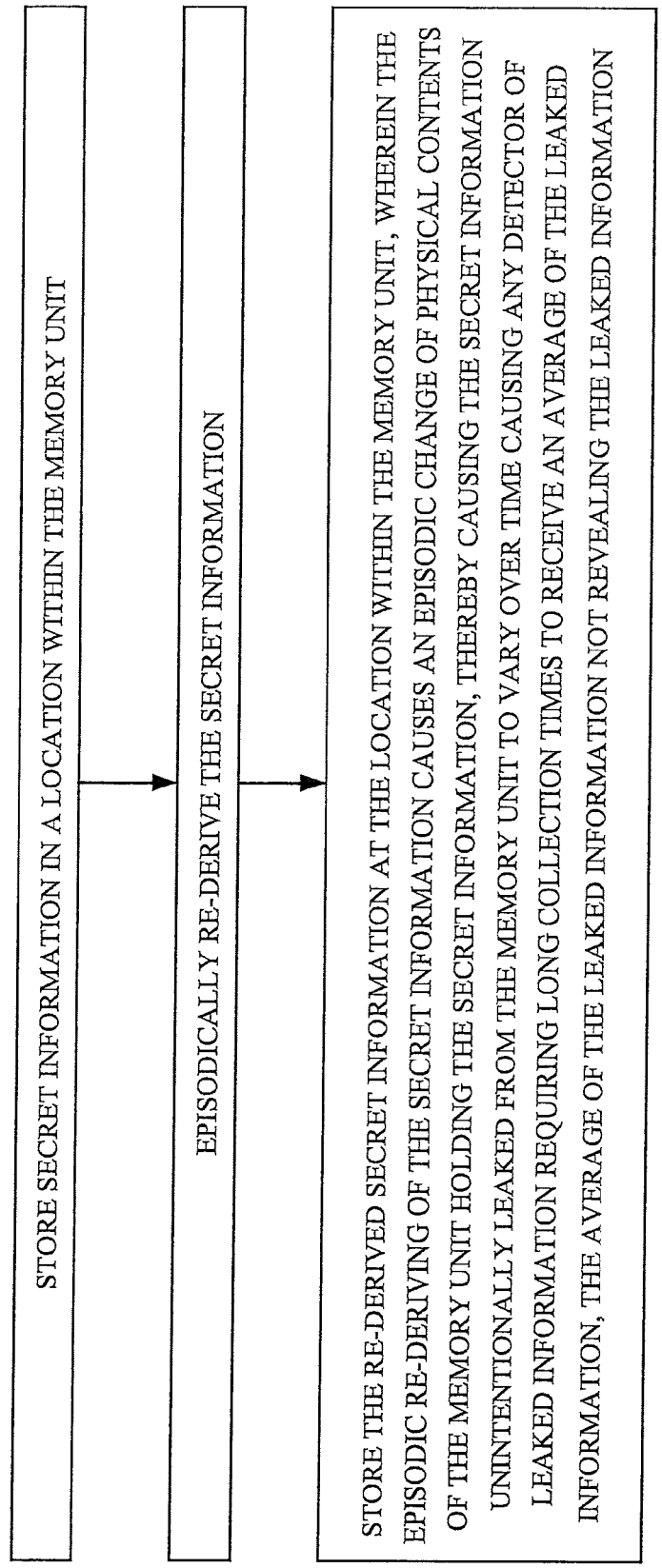

Reference is now made to FIGS. 4 and 5, which are simplified flowcharts of methods of operation of the system of FIG. 1. FIGS. 4 and 5 are believed to be self-explanatory in light of the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:
1. A machine-implemented method for hindering detection of secret information unintentionally leaked from a secret held in a memory unit, the method comprising:
  storing the secret information in a location within the memory unit;
  episodically re-deriving the secret information by performing the following:
    retrieving a first key from a location in a second memory unit;
    generating a second key;
    performing one of: decrypting the secret information with the first key and encrypting it with the second key; and deobfuscating the secret information with the first key and obfuscating it again with the second key; and
    storing the second key in the second location in memory; and
  storing the re-derived secret information at the location within the memory unit,
  wherein the episodic re-deriving of the secret information causes an episodic change of physical contents of the memory unit holding the secret information, thereby causing the secret information unintentionally leaked from the memory unit to vary over time causing any detector of leaked information requiring long collection times which are longer than feasible to receive an average of the leaked information, the average of the leaked information not revealing the leaked information.

2. The method according to claim 1 and wherein the memory unit comprises one of:
  a register; and
  random access memory.

3. The method according to claim 1 wherein the re-deriving the secret information comprises a XOR-ing the secret information with one of a random number; and a pseudo-random number.

4. The method according to claim 1 and wherein the episodically re-deriving the secret information is performed at time intervals dependent on a timing mechanism which is tamper resistant.

5. The method according to claim 4 and wherein the time intervals are random time intervals.

6. A system for hindering detection of secret information unintentionally leaked from a secret held in a memory unit, the system comprising:
  a secret information store which stores the secret information in a location within the memory unit;
  an episodic secret information re-deriver, the re-deriver comprising:
    a second memory location storing a first key;
    a key generator which generates a second key;
    a processor operative to perform one of: decrypt the secret information with the first key and encrypt it with the second key; and deobfuscate the secret information with the first key and obfuscate it again with the second key; and
    the second memory location then storing the second key; and
  the secret information store being operative to store the re-derived secret information at the location within the memory unit,
  wherein the episodic re-deriving of the secret information causes an episodic change of physical contents of the memory unit holding the secret information, thereby causing the secret information unintentionally leaked from the memory unit to vary over time causing any detector of leaked information requiring long collection times which are longer than feasible to receive an average of the leaked information, the average of the leaked information not revealing the leaked information.

7. The method according to claim 1 and wherein the secret information comprised in the memory unit is comprised in the memory unit in an obfuscated form.

8. The method according to claim 7 and wherein the obfuscation comprises cryptographic obfuscation.

9. The method according to claim 1 and wherein the second memory location comprises one of:
a register; and
RAM.

10. The method according to claim 1 wherein the deobfuscating the secret information with the first key and obfuscating it again with the second key comprises a XOR-ing the secret information with a pseudo-random number.

11. The method according to claim 1 wherein the deobfuscating the secret information with the first key and obfuscating it again with the second key comprises holding the secret information in a shift register which is changed each time the register is clocked, and the first and second keys comprise the number of fast shifts of the shift register which are required to restore every bit of the original secret information.

12. The method according to claim 1 wherein the episodically re-deriving the secret information comprises episodically changing each bit of the secret information.

* * * * *

UNITED STATES PATENT AND TRADEMARK OFFICE
CERTIFICATE OF CORRECTION

PATENT NO. : 8,913,745 B2  
APPLICATION NO. : 13/958986  
DATED : December 16, 2014  
INVENTOR(S) : Shen-Orr et al.

Page 1 of 1

It is certified that error appears in the above-identified patent and that said Letters Patent is hereby corrected as shown below:

On the Title Page item [56] on Page 2, Line 6, delete "EP 09 769 891.8" and insert --EP 09 769 691.8--.

Signed and Sealed this  
Third Day of March, 2015

Michelle K. Lee  
*Deputy Director of the United States Patent and Trademark Office*

UNITED STATES PATENT AND TRADEMARK OFFICE
CERTIFICATE OF CORRECTION

PATENT NO. : 8,913,745 B2
APPLICATION NO. : 13/958986
DATED : December 16, 2014
INVENTOR(S) : Shen-Orr et al.

It is certified that error appears in the above-identified patent and that said Letters Patent is hereby corrected as shown below:

On the Title Page item [56] on Page 2, Column 2, line 34, delete "EP 09 769 891.8" and insert --EP 09 769 691.8--.

This certificate supersedes the Certificate of Correction issued March 3, 2015.

Signed and Sealed this
Twenty-first Day of April, 2015

Michelle K. Lee
*Director of the United States Patent and Trademark Office*